United States Patent
Zimmerman et al.

(10) Patent No.: US 8,954,189 B2
(45) Date of Patent: Feb. 10, 2015

(54) SECURITY AND TRACKING SYSTEM AND PROCESS FOR AGRICULTURAL PRODUCT DISTRIBUTION

(71) Applicant: Aaron Jay Zimmerman, Pierce, NE (US)

(72) Inventors: Aaron Jay Zimmerman, Pierce, NE (US); Dan Spray, Norfolk, NE (US)

( * ) Notice: Subject to any disclaimer, the term of this patent is extended or adjusted under 35 U.S.C. 154(b) by 0 days.

(21) Appl. No.: 14/061,626

(22) Filed: Oct. 23, 2013

(65) Prior Publication Data

US 2014/0114467 A1    Apr. 24, 2014

Related U.S. Application Data

(60) Provisional application No. 61/717,134, filed on Oct. 23, 2012.

(51) Int. Cl.
*G06F 7/00* (2006.01)
*G06Q 10/08* (2012.01)

(52) U.S. Cl.
CPC ..................... *G06Q 10/08* (2013.01)
USPC .......... 700/216; 700/214; 700/218; 700/213; 700/228; 700/230; 700/231; 700/232

(58) Field of Classification Search
None
See application file for complete search history.

(56) References Cited

U.S. PATENT DOCUMENTS

2006/0038010 A1 *   2/2006   Lucas ........................... 235/385

* cited by examiner

*Primary Examiner* — Yolanda Cumbess
(74) *Attorney, Agent, or Firm* — Plager Schack LLP

(57) ABSTRACT

Sonic embodiments provide an agricultural commodity distribution system that provides secure distribution of an agricultural commodity to an authorized person. In some embodiments, the system comprises a server computing device, a data storage associated with the computing device, and a controller that activates the distribution to the authorized person. In some embodiments, the server is communicably connected to a mobile communication device of a person such that the person can send the distribution request to the server via the mobile communication device. The server of some embodiments is associated with the data storage such that the server can validate the distribution request against data stored in the data storage. The server of some embodiments is also communicably connected to the controller such that the server transmits an activation code to the controller when the distribution request is validated.

8 Claims, 4 Drawing Sheets

SECURITY AND TRACKING SYSTEM AND PROCESS FOR AGRICULTURAL PRODUCT DISTRIBUTION

CLAIM OF BENEFIT TO PRIOR APPLICATION

This application claims benefit to U.S. Provisional Patent Application 61/717,134, entitled "Security and Tracking for Agricultural Product Distribution," filed Oct. 23, 2012. U.S. Provisional Patent Application 61/717,134 is incorporated herein by reference.

BACKGROUND

The embodiments herein relate generally to agricultural product and commodity distribution and, in particular, to tracking and security systems used in the distribution of agricultural products and commodities.

The distribution of products and commodities (hereafter referred to as "commodities"), such as grain, fuel, and fertilizer, from on-site storage facilities to other locations typically involves hauling loads of the commodities with trucks. When the seller or producer of the commodities does not own or operate the trucks, the trucks may be provided by a local coop or grain elevator operator, whereby the trucks transfer the commodities from the on-site storage facilities to the grain elevators or other destinations. In particular for agricultural commodities, depending on the amount of agricultural commodities produced, the seller or producer of the agricultural commodities may require hundreds of truckloads of the agricultural commodities to be removed from the on-site storage facilities. This produces a demanding task for the seller or producer of the agricultural commodities to track the shipments and/or track the distribution of agricultural commodities from the on-site storage facilities. Furthermore, the seller or producer of the agricultural commodities may instead rely on the local coop or grain elevator operator to provide sufficient accounting, but such accounting may not always be accurate or honest. While video surveillance may be utilized to review grain distribution and track individuals taking loads of grain from an on-site storage bin, the video processing may be time consuming, tedious, and inaccurate.

Thus, there is a need for security/tracking of agricultural and non-agricultural commodity distribution.

BRIEF SUMMARY

Some embodiments of the invention provide a novel commodity distribution system that provides secure distribution of a commodity to an authorized person. In some embodiments, the system comprises a server computing device, a data storage associated with the computing device, and a controller that activates the commodity distribution to the authorized person. In some embodiments, the person uses a mobile communication device to send a request to the server for distribution of the commodity. Upon receiving the request from the mobile communication device, the server determines whether the requested distribution is authorized. In some embodiments, the server searches the data storage for data that matches an identifier of the mobile communication device. When the server determines that the requested distribution is authorized, the server of some embodiments transmits an activation code to the controller to allow the distribution to proceed.

Some embodiments provide a novel process for securely distributing a commodity to an authorized person. The commodity is one of an agricultural commodity and a non-agricultural commodity. In some embodiments, the process receives a request for distribution of the commodity, verifies authenticity of the requested distribution, and authorizes a controller to be activated for distribution of the commodity to proceed. In some embodiments, the system performs the process for securely distributing the commodity. In some embodiments, the process verifies authenticity by (i) receiving, from a mobile communication device of the person, a set of distribution request data comprising a distribution request and a unique identifier of the mobile communication device, (ii) searching a data storage for the unique identifier of the mobile communication device, and (iii) when the unique identifier is found in the data storage, validating the received distribution request.

In some embodiments, the process verifies authenticity by (i) receiving, from a mobile communication device of the person, a set of distribution request data comprising distribution request, an authentication code, and a unique identifier of the mobile communication device, (ii) searching a data storage for a set of authentication data that matches one of the authentication code and the unique identifier from the set of distribution request data, (iii) when matching authentication data is found in the data storage, determining whether the data storage stores the other set of distribution request data in association with the matching authentication data; and (iv) when the data storage stores both the matched and associated sets of data, validating the distribution request.

BRIEF DESCRIPTION OF THE DRAWINGS

Having described the invention in general terms, reference is now made to the accompanying drawings, which are not necessarily drawn to scale, and wherein.

DETAILED DESCRIPTION

Some embodiments of the invention provide a novel commodity distribution system that provides secure distribution of a commodity to an authorized person. In some embodiments, the system comprises a server computing device, a data storage associated with the computing device, and a controller that activates the commodity distribution to the authorized person. In some embodiments, the server is communicably connected to a mobile communication device of a person such that the person can send the distribution request to the server via the mobile communication device. The server of some embodiments is associated with the data storage such that the server can validate the distribution request against data stored in the data storage. The server of some embodiments is also communicably connected to the controller such that the server transmits an activation code to the controller when the distribution request is validated. In some embodiments, the commodity requested for distribution is an agricultural commodity. In some embodiments, the commodity requested for distribution is a non-agricultural commodity.

In some embodiments, the server receives a request for distribution of an agricultural commodity from a mobile communication device of a person. In some embodiments, the server determines whether the requested distribution is authorized. In some embodiments, the server searches the database for data that matches an identifier of the mobile communication device. When the server determines that the requested distribution is authorized, the server of some embodiments transmits an activation code to the controller to allow the distribution to proceed.

In some embodiments, the system employs software-controlled power interrupt that incorporates detailed SMS (short message service) based authentication and load tracking for the secure tracking and distribution of agricultural commodities. For instance, a person may use a cell phone to send a text message to the server requesting distribution of a truck load of winter wheat. In some embodiments, the software-controlled power interrupt incorporates mobile application-based authentication and load tracking the secure tracking and distribution of agricultural commodities. For example, a person may have a mobile application (or "app") installed on a smart phone that allows the person to send a request to the server for distribution of a pre-determined amount of barley.

Figure 1:
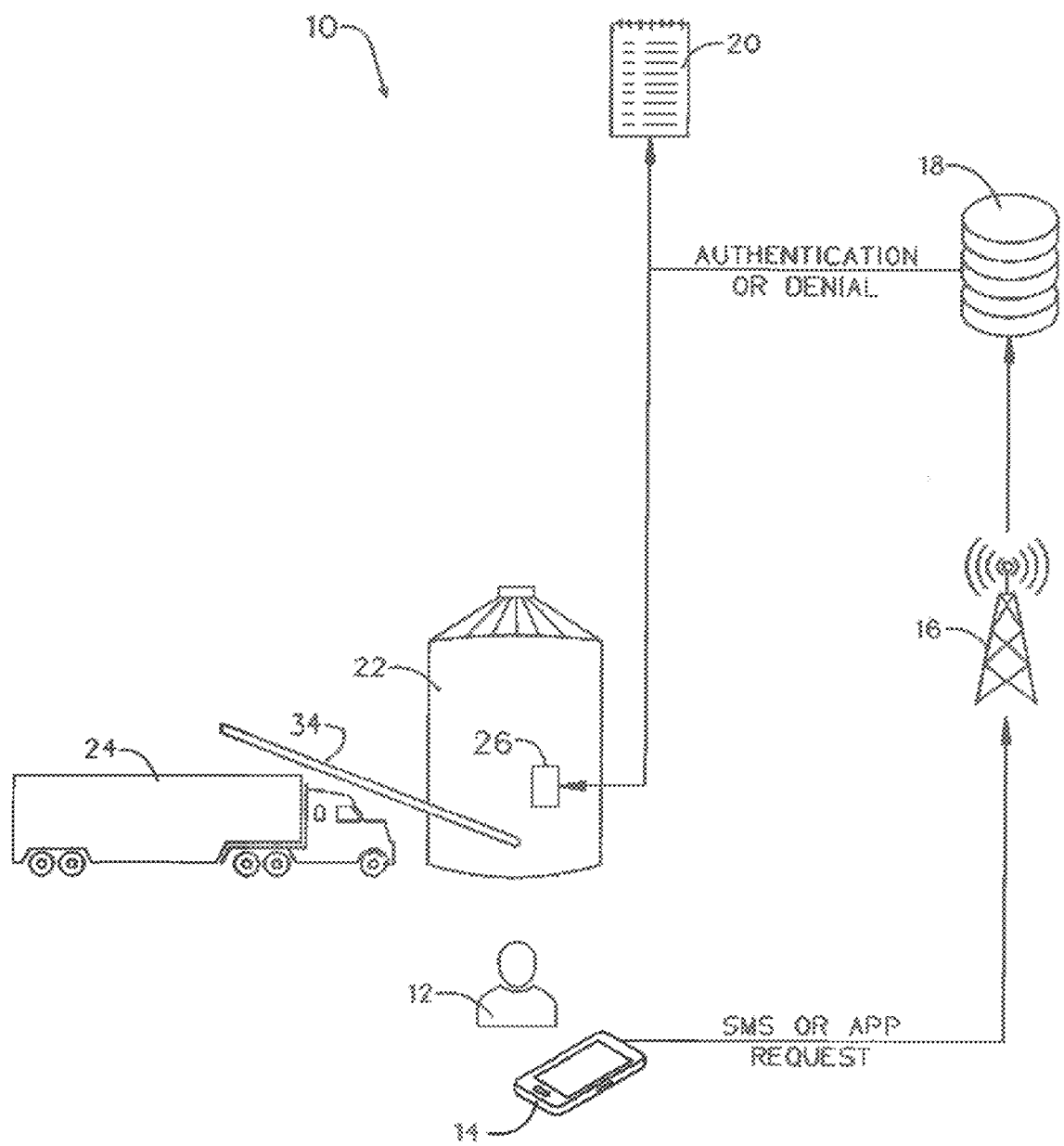
FIG. 1 conceptually illustrates a security and tracking commodity distribution system in some embodiments.

By way of example, FIG. 1 conceptually illustrates a security and tracking commodity distribution system 10 in some embodiments. In general, the system 10 in this figure provides security, whereby only authorized users are can have their requests validated by the system. The system 10 uses any sort of conventional identifier to verify authenticity of requests. For example, the server may look at the cell phone number from which a request is received, a password that is included in a text message or in a set of data from a mobile app, or even a hardware identification associated with a hardware device and/or chip within the cell phone. The system 10 also provides tracking, whereby caller ID, time and date stamp, and time duration of distribution load-out can be tracked. The system 10 thereby allows a user to track who received or removed grain, when the grain was received or removed, where the grain was received or removed (e.g., multiple storage bins are present on-site), and how much grain was received or removed from each bin at the user's facility.

While the examples described by reference to FIGS. 1-4 pertain to distribution of an agricultural commodity (e.g., grain, fertilizer, etc.), it should be evident that the system can be applied in any scenario in which a commodity is to be distributed, including non-agricultural commodities. For instance, the system can be applied to a fuel coop in which coop members can access to a prepaid volume of fuel using a fuel pump (e.g., to fill up a car, boat, etc.) that gets armed for delivery of the fuel after a server authenticates their identity and status as a coop member. As this example demonstrates, the system can apply to any fluid pumping system where requests for a particular fluid are validated by a server processing unit and a controller is armed for active distribution of the requested fluid upon authentication of the request by the server. The system further applies to hybrid systems that pump fluids and commodities. For instance, an air flow jetting system may allow the distribution of a grain to be completed after request and authorization.

Referring back to FIG. 1, the system includes many elements that are needed to properly handle requests for distribution. Some elements of the system 10 shown in FIG. 1 are more closely described by reference to FIGS. 2-4. In particular, the system 10 includes a server computing device 18 with integrated data storage. The server 18 is communicably connected to the control system 26 and, via a communication tower 16 (e.g., cell tower), to at least one mobile communication device 14 of a particular person 12. The person 12 may be a driver of the truck 24 which is parked proximate to a grain silo 22 for receiving a distribution of the requested agricultural commodity. A conveyor 34 is shown providing the commodity from the silo 22 to the truck 24. However, the commodity will not be released from the silo 22 until the server 18 has completely verified the authenticity of the request, the mobile communication device 14, and/or the person 12. Once authenticated, the conveyor 34 is armed for delivering the commodity to the truck 24.

Figure 2:
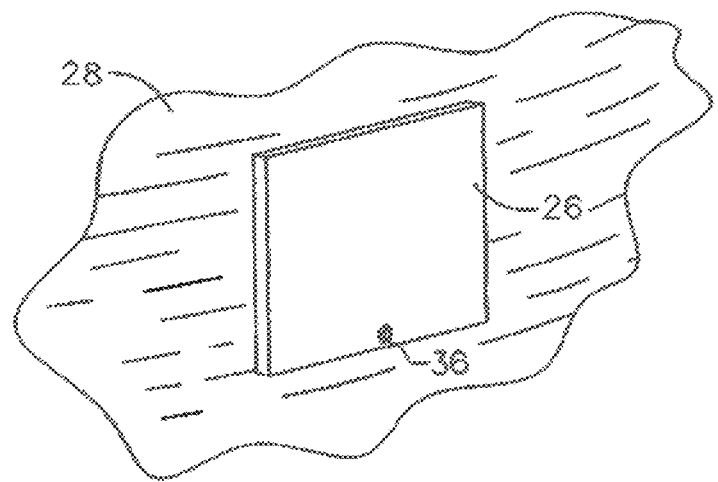
FIG. 2 conceptually illustrates an outer perspective view of a storage bin control box of a security and tracking commodity distribution system in some embodiments.
Figure 3:
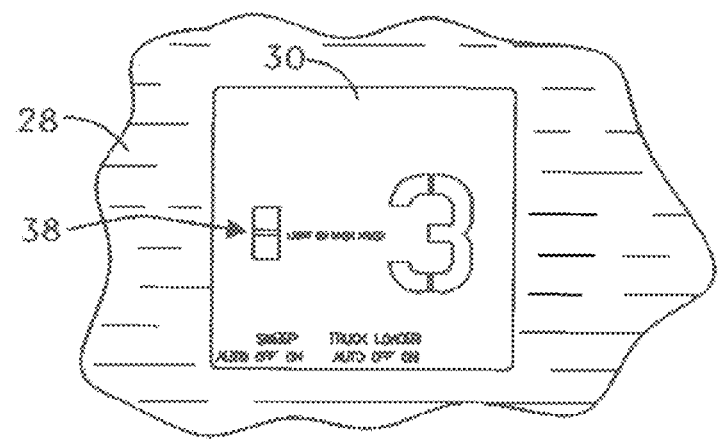
FIG. 3 conceptually illustrates an inner perspective view of the storage bin control box of the system shown in FIG. 2.

The server 18 in some embodiments is able to remotely control the distribution of the commodity via the control system 26. In particular, the server 18 sends the control system 18 an activation code for arming a control switch upon authentication of the password, unique hardware ID, and/or telephone number of the mobile device 14. As shown in FIG. 2, the control system is positioned conveniently along the outer wall surrounding the silo 22. This allows the person 12 to access the control system from a location that is near the location where the truck 24 will receive delivery of the agricultural commodity from the conveyor 34. Also, the control system 26 is a covered box which, in some embodiments, includes a lock panel 36 for key-based opening of the box. In some embodiments, the lock-panel 36 includes an automated lock that releases the lock only upon authentication of the distribution request. This further ensures that only a select set of persons are permitted access to the inside of the cover (e.g., by distribution of a key to paid customers, or by authentication of the distribution request). This prevents vandalism and unwanted access to the auger control interface 30 that are revealed in FIG. 3 under the cover of the system box 26.

As stated above, the server 18 may send an activation code to the control box 26 that allows for remote security of the distribution process. For instance, the activation code may be sent by the server 18 to the auger control interface 30 of the control box 26, such that an on/off switch 38 is remotely toggled on and off. When the distribution system is not armed, the person 12 is not able to start the conveyor to distribute the commodity. Only when the auger control interface 30 receives a valid activation code from the server 18 will the person 12 be able to start distribution (e.g., by pressing the on/off switch 38). This again makes it difficult to steal agricultural commodities because the person would need to send a password to the server 18, or simply a request, and the server would be able to verify the authenticity of the source of the request (i.e., the person's cell phone) based on a unique hardware identification of the cell phone or of a SIM card configured to operate with the cell phone 14, but nothing is operational until the server 18 is able to authenticate the request for the agricultural commodity and send the activation code to the control system 30.

Figure 4:
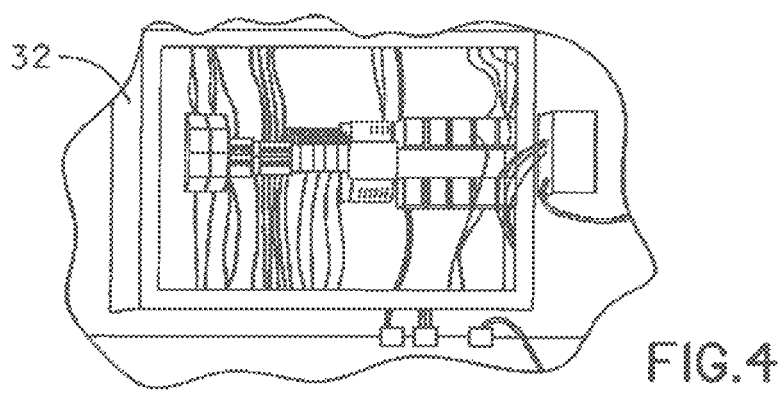
FIG. 4 conceptually illustrates an electronics hub that provides operational power to a security and tracking commodity distribution system in some embodiments.

During operation, the server 18 in the system 10 waits for an incoming SMS text message. The server 18 may determine whether the incoming SMS text message originates from an authorized user, as described in part above. When the user is verified to be an authorized user, the system proceeds with processing and logging the individual request for distribution from a storage bin. Auger motors corresponding to particular storage bins are present in a power system 32, as shown in FIG. 4. The auger motors of some embodiments are timed and used to verify quantity and validity of the load. In one embodiment, the system may define limitations on an authorized user, such as by defining a range of dated times for authorized dispensation, an amount of commodity for dispensation, a duration of operation of the unload auger motor, or the like.

The system 10 tracks and records the data associated with the dispensation, including, but not limited to, quantity, time and date of dispensing, and duration of dispensing. The system may also include a response system, where the system queries the truck driver to respond via SMS text message with data associated with the grain elevator-ticketed load bushels. The system 10 may also query the truck driver to respond with moisture data for later analysis by the user of the system.

In some embodiments, the server 18 manages a log 20 of distributions and/or authentication requests. All information is logged into a web-based system to set security levels and view load logs. In some embodiments, the load logs are accessible via the web-based system. In some embodiments, the log maintains an accurate accounting of distributions of commodities to persons, such that all prepaid quotas for distribution to a particular person can be accurately applied when the person requests a new distribution of a commodity. In addition, the log may act as a fail-safe security mechanism, preventing unauthorized access to agricultural commodities. For example, the log may be read by the server 18, such that when a threshold number of failed authentication attempts have been performed by a person within a defined time period, the server will automatically block all further requests until a system override (e.g., manual override by a system administrator) is performed.

Although the example shown here had an auger-style conveyor for distributing the agricultural commodity from the silo 22, the conveyor 34 could realistically be any conventional conveyance apparatus or system, including a conveyor belt system, a screw-type conveyor with an auger, or another kind of conveyance channel. In addition, in some cases, the truck 24 can be parked under an elevated silo 22 (e.g., a silo having legs or stilts), in which case the agricultural commodity may be distributed out of the silo and into the truck bed through a chute or opening of the silo.

Also, the system 10 may monitor and control grain dryers. It is contemplated that the system may also integrate live grain bin moisture and temperature readings, as well as scale-measured load quantities into the log 20 (e.g., a web based monitoring/logging system).

Some embodiments provide a novel process for securely distributing a commodity to an authorized person. The commodity is one of an agricultural commodity and a non-agricultural commodity. In some embodiments, the process receives a request for distribution of the commodity, verifies authenticity of the requested distribution, and authorizes a controller to be activated for distribution of the commodity to proceed. In some embodiments, the system 10 performs the process for securely distributing the commodity. In some embodiments, the process verifies authenticity by (i) receiving, from a mobile communication device of the person, a set of distribution request data comprising a distribution request and a unique identifier of the mobile communication device, (ii) searching a data storage for the unique identifier of the mobile communication device, and (iii) when the unique identifier is found in the data storage, validating the received distribution request.

Figure 5A:
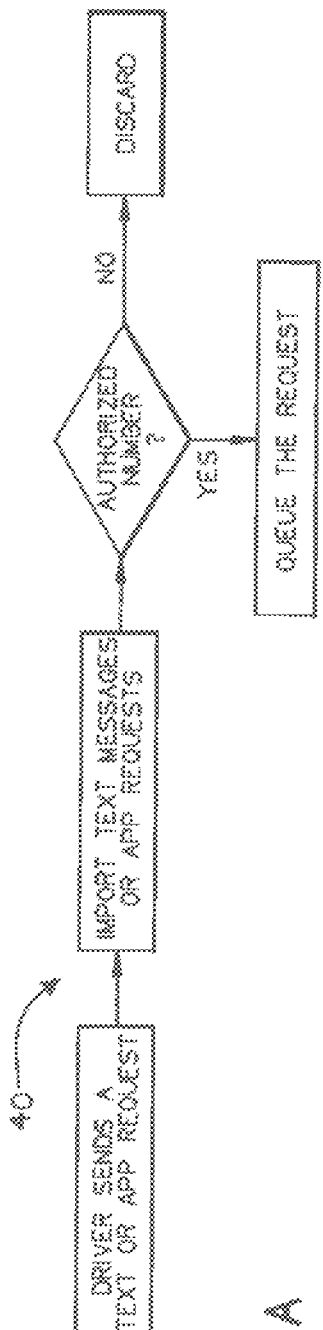
FIGS. 5A-5C conceptually illustrate a process for securely distributing a commodity to an authorized person in some embodiments.
Figure 5B:
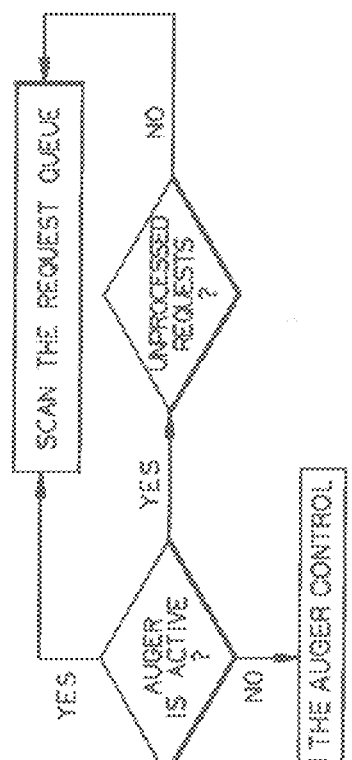
Figure 5C:
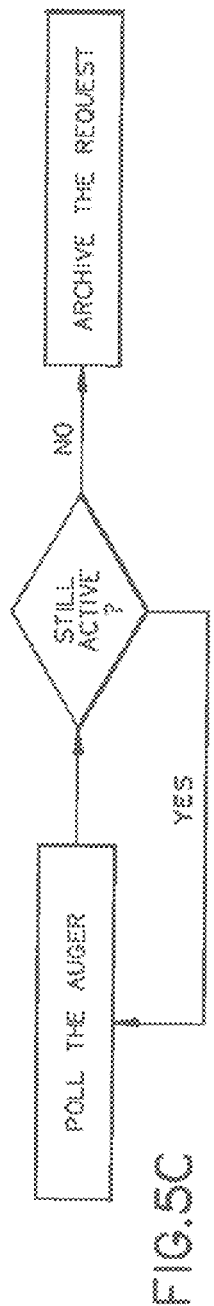

By way of example, FIGS. 5A-5C conceptually illustrate an example process 40 for securely distributing an agricultural commodity. As shown, the process 40 starts when a driver sends a text or app request to the server. The server 18 imports text messages or app requests. Next, the authorized number is determined to be a valid registered number or not. In some embodiments, the server 18 performs a check in the data. If the number is not authorized, the process 40 transitions to the next step to discard information. The request may get queued.

As shown in FIG. 5B, the process determines whether an auger is active. if no auger is active, the process performs an operation to arm the auger control. However, if there is an active auger, the process 40 scans the request queue and determines if there are any unprocessed requests. As in FIG. 5C, when there are unprocessed requests, the process checks if the control is armed, and if so, polls the auger. Alternatively, if the control is no longer active, the process archives the request. Although the example process 40, described by reference to FIGS. 5A-5C, pertains to the distribution of an agricultural commodity, the process 40 can be applied in situations that require the distribution of non-agricultural commodities.

In some embodiments, the process verifies authenticity by (i) receiving, from a mobile communication device of the person, a set of distribution request data comprising distribution request, an authentication code, and a unique identifier of the mobile communication device, (ii) searching a data storage for a set of authentication data that matches one of the authentication code and the unique identifier from the set of distribution request data, (iii) when matching data is found in the data storage, determining whether the data storage stores the other set of distribution request data in association with the matching data; and (iv) when the data storage stores both the matched and associated sets of data, validating the distribution request.

Many of the above-described features and applications are implemented as software processes that are specified as a set of instructions recorded on a computer readable storage medium (also referred to as computer readable medium or machine readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

In this specification, the term "software" is meant to include firmware residing in read-only memory or applications stored in magnetic storage, which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention. In sonic embodiments, the software programs, when installed to operate on one or more electronic systems, define one or more specific machine implementations that execute and perform the operations of the software programs.

Figure 6:
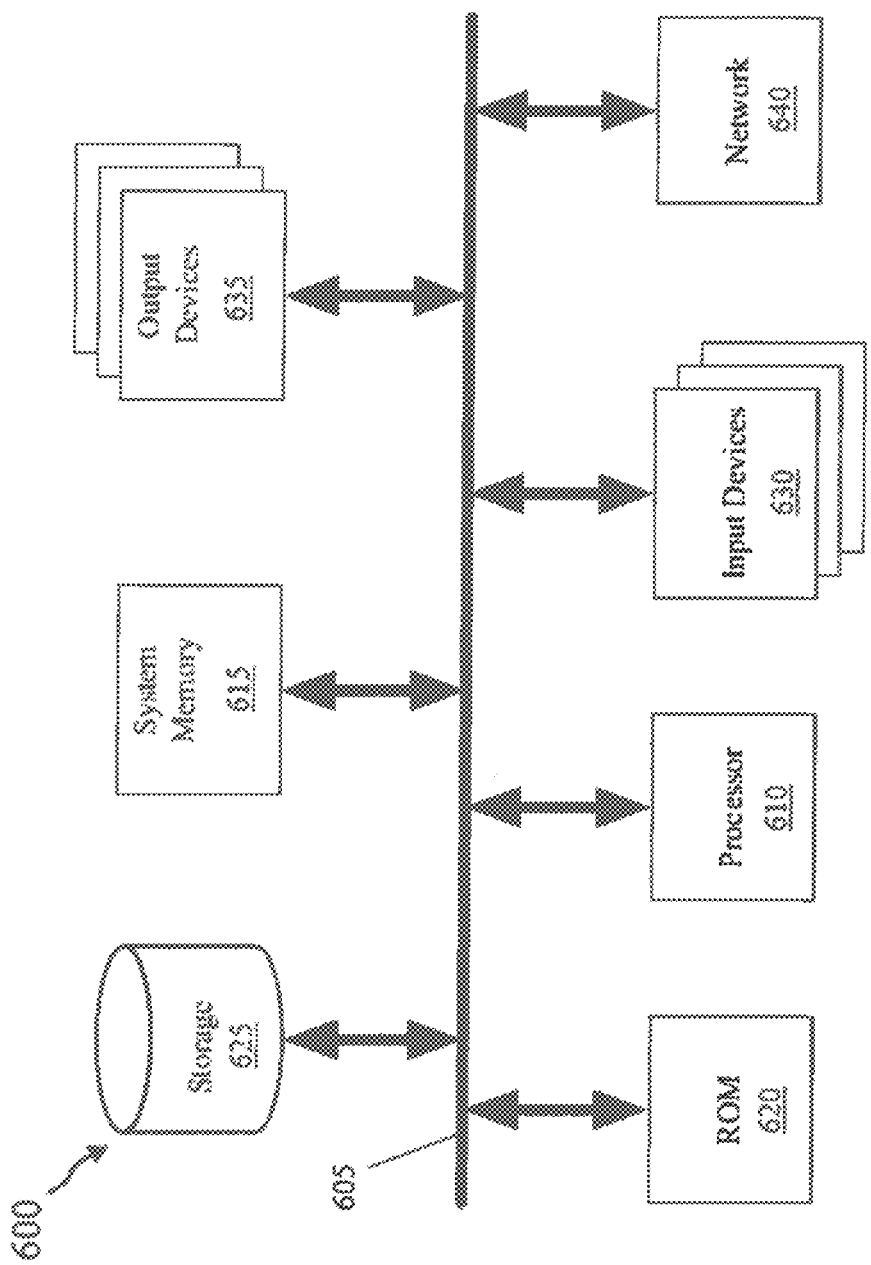
FIG. 6 conceptually illustrates an electronic system with which some embodiments of the invention are implemented.

FIG. 6 conceptually illustrates an electronic system 600 with which some embodiments of the invention are implemented. The electronic system 600 may be a computer, phone, PDA, or any other sort of electronic device. Such an electronic system includes various types of computer readable media and interfaces for various other types of computer readable media. Electronic system 600 includes a bus 605, processing unit(s) 610, a system memory 615, a read-only 620, a permanent storage device 625, input devices 630, output devices 635, and a network 640.

The bus 605 collectively represents all system, peripheral, and chipset buses that communicatively connect the numerous internal devices of the electronic system 600. For instance, the bus 605 communicatively connects the processing unit(s) 610 with the read-only 620, the system memory 615, and the permanent storage device 625.

From these various memory units, the processing unit(s) 610 retrieves instructions to execute and data to process in order to execute the processes of the invention. The processing unit(s) may be a single processor or a multi-core processor in different embodiments.

The read-only-memory (ROM) 620 stores static data and instructions that are needed by the processing unit(s) 610 and other modules of the electronic system. The permanent storage device 625, on the other hand, is a read-and-write memory device. This device is a non-volatile memory unit that stores instructions and data even when the electronic system 600 is off. Some embodiments of the invention use a mass-storage device (such as a magnetic or optical disk and its corresponding disk drive) as the permanent storage device 625.

Other embodiments use a removable storage device (such as a floppy disk or a flash drive) as the permanent storage device 625. Like the permanent storage device 625, the system memory 615 is a read-and-write memory device. However, unlike storage device 625, the system memory 615 is a volatile read-and-write memory, such as a random access memory. The system memory 615 stores some of the instructions and data that the processor needs at runtime. In some embodiments, the invention's processes are stored in the system memory 615, the permanent storage device 625, and/or the read-only 620. For example, the various memory units include instructions for processing appearance alterations of displayable characters in accordance with some embodiments. From these various memory units, the processing unit (s) 610 retrieves instructions to execute and data to process in order to execute the processes of some embodiments.

The bus 605 also connects to the input and output devices 630 and 635. The input devices enable the user to communicate information and select commands to the electronic system. The input devices 630 include alphanumeric keyboards and pointing devices. The output devices 635 display images generated by the electronic system 600. The output devices 635 include printers and display devices, such as cathode ray tubes (CRT) or liquid crystal displays (LCD). The system may include devices such as a touchscreen that functions as both input and output devices.

Finally, as shown in FIG. 6, bus 605 also couples electronic system 600 to a network 640 through a network adapter (not shown). In this manner, the computer can be a part of a network of computers (such as a local area network ("LAN"), a wide area network ("WAN"), or an Intranet), or a network of networks (such as the Internet). Any or all components of electronic system 600 may be used in conjunction with the invention.

These functions described above can be implemented in digital electronic circuitry, in computer software, firmware or hardware. The techniques can be implemented using one or more computer program products. Programmable processors and computers can be packaged or included in mobile devices. The processes and logic flows may be performed by one or more programmable processors and by one or more set of programmable logic circuitry. General and special purpose computing and storage devices can be interconnected through communication networks.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SI) cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the invention has been described with reference to numerous specific details, one of ordinary skill in the art will recognize that the invention can be embodied in other specific forms without departing from the spirit of the invention. Thus, one of ordinary skill in the art would understand that the invention is not to be limited by the foregoing illustrative details and examples, but rather is to be defined by the appended claims.

We claim:

1. A secure agricultural commodity distribution system that determines whether to arm a control panel to allow distribution of an agricultural commodity requested from a mobile communication device of a person, said system comprising:
   a distribution control panel comprising a set of distribution switches that are one of operationally active and inactive for a pre-deteremined amount of time after the distribution control panel receives an activation status code comprising only one of an access denied status and an access authorized status;
   a server computing device comprising a network communication device for connecting to a network through which (i) a request for the agricultural commodity is received from the mobile communication device of the person and (ii) the activation status code is sent to the control panel;
   a storage bin comprising a large inner storage area for storing the agricultural commodity and an opening for releasing the agricultural commodity out of the storage bin; and
   a conveyor that moves some of the agricultural commodity into a truck designated to receive the distribution when the control panel is operationally active.

2. The secure agricultural commodity distribution system of claim 1, wherein the conveyor is an auger conveyor.

3. The secure agricultural commodity distribution system of claim 1, wherein the conveyor is a fluid pumping system.

4. The secure agricultural commodity distribution system of claim 1, said system further comprising a log file for tracking distribution amounts, wherein said server updates the log file after each distribution.

5. The secure agricultural commodity distribution system of claim 1, said system further comprising a database that stores a set of data retrieved to authenticate one or more requests for agricultural commodity distributions, wherein the set of data comprises a unique identifier associated with a mobile communication device and a telephone number associated with the mobile communication device.

6. A non-transitory computer readable medium storing a program which when executed by at least one processing unit of a server computing device determines whether to activate a control for distributing an agricultural commodity requested from a mobile communication device of a person, said program comprising sets of instructions for:

receiving, from a mobile communication device of a person, a request for the distribution of a particular agricultural commodity;

determining whether to authorize the requested distribution based on an authentication code received with the request;

sending an activation status code to a control system that can activate and deactivate a conveyance system for delivery of the requested agricultural commodity to a receiving bin, wherein the activation status code is one of (i) a denial code and (ii) a confirmed authentication code; and arming a control switch in the control system when the activation status code is a confirmed authentication code.

7. The non-transitory computer readable medium of claim 6, wherein the authentication code is one of (i) a telephone number associated with the mobile computing device, (ii) a unique hardware device identifier associated with a hardware device of the mobile computing device, and (iii) a password entered into the mobile computing device.

8. The non-transitory computer readable medium of claim 6, wherein the conveyance system starts to deliver the agricultural commodity when the armed control switch is toggled from an inactive mode to an active operation mode.

\* \* \* \* \*